April 7, 1931.                J. D. RAUCH                1,799,929
                              DIPPER TOOTH
                           Filed June 10, 1929
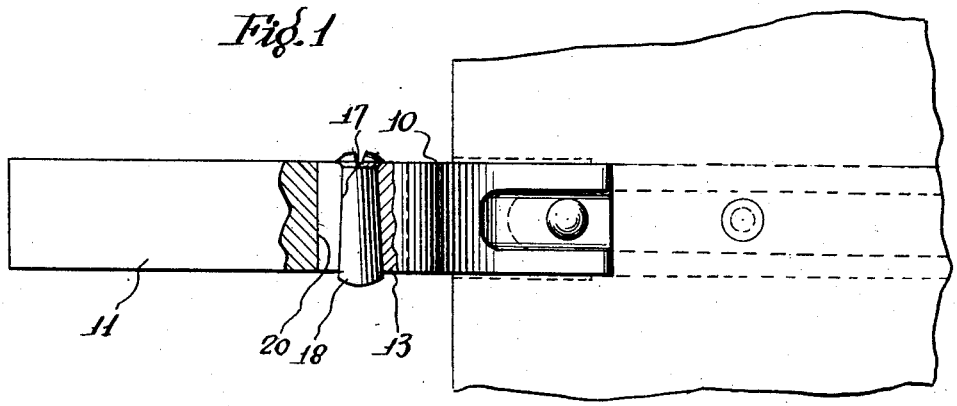
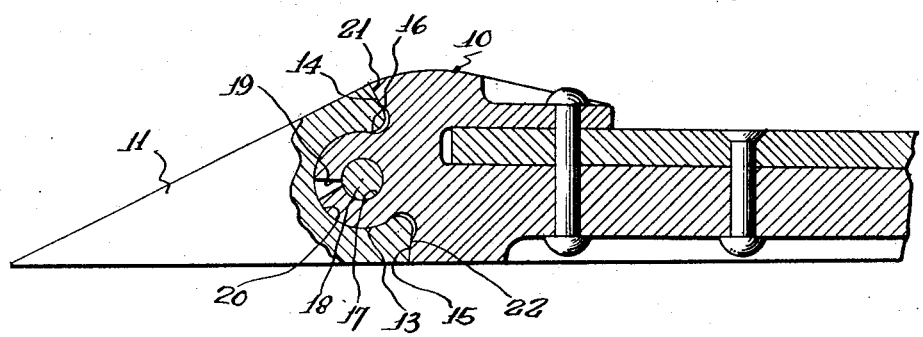
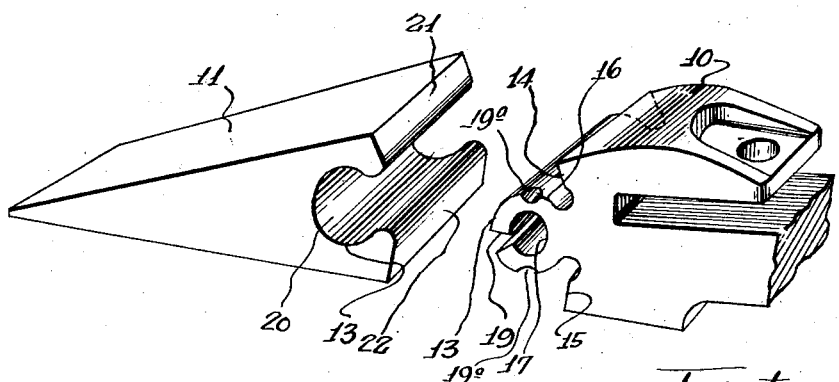
Inventor
John D. Rauch
Offield Towle Scott & Poole
Attorneys Patented Apr. 7, 1931

1,799,929

UNITED STATES PATENT OFFICE

JOHN D. RAUCH, OF LIMA, OHIO

DIPPER TOOTH

Application filed June 10, 1929. Serial No. 369,720.

This invention relates to improvements in dipper teeth, and more particularly to removable and reversible tooth points for the same, and has for its object to provide an improved and simplified construction for devices of the character described, which may be readily attached or detached, and when in use is securely held in place.

The invention may best be understood by reference to the accompanying drawing, in which—

Figure 1 is a plan view of a dipper tooth constructed in accordance with my invention.

Figure 2 is a side view of the device shown in Figure 1.

Figure 3 is a view in perspective of the tooth and base in detached position.

In the drawings, the dipper tooth comprises a base 10 and a removable point 11. The base 10 is attached in the usual manner to a dipper which is not shown herein as it forms no part of the present invention.

The base 10 is provided at its forward end with a cylindrical part 13, projecting with its axial center slightly beyond two shoulders 14 and 15 on opposite sides thereof, so as to form a reduced neck portion 16 connecting said cylindrical portion 13 to the base 10.

The cylindrical part 13 is arranged to project at a slightly inclined angle to the base 10, as shown. It is provided with an axially disposed tapered socket 17 to receive a retaining bolt or rivet 18, and is split at its outer end, as indicated at 19.

The tooth point 11 is wedge-shaped and is provided at its larger end with a centrally disposed recess or slot 20 which snugly fits over the part 13, and having oppositely extending shoulders 21 and 22 which bear against shoulders 14 and 15, respectively, at the sides of said cylindrical part. The shoulders 21 and 22 are symmetrically disposed relative to the recess 20, so as to permit the tooth to be reversed or inverted relative to the base 10 when desired.

The tooth point is secured in place by inserting the rivet 18, preferably wedge-shaped, in the tapered socket 17 so as to spread the split walls of the cylindrical part 13. In the form shown, the rivet 18 is provided with a split point and secured in place by peening over the ends thereof, but other securing means may be employed for a similar purpose, if desired.

The tooth point may be readily removed by knocking out the rivet so as to permit the cylindrical part to contract. In order to assist in loosening the point, two recesses 19a, 19a may be provided at opposite edges of the cylindrical part 13, for insertion of a suitable tapered tool, such as a drift or the like.

From the above description it will be understood that the tooth point is both detachable for replacement, or reversible so as to afford wear on both sides of the tooth point, thus greatly increasing the effective life of each tooth.

Although I have shown and described one embodiment of my invention, it will be understood that I do no not wish to be limited to the exact construction shown and described, but that various changes and modifications may be made without departing from the spirit and scope of my invention.

I claim as my invention:

1. A dipper tooth including a support and a removable point, one of said members having a socket in its base, an elongated interlocking projection on the other of said members split lengthwise thereof, fitting endwise into said socket, and securing means extending through the length of said projection and having wedging action therein to lock the latter in said socket.

2. A dipper tooth including a support and a removable point, one of said members having a socket in its base, an elongated interlocking projection on the other of said members split lengthwise thereof, fitting endwise into said socket, and securing means extending through the length of said projection and having wedging action therein to lock the latter in said socket, said point being substantially symmetrical in shape relative to its socket so as to permit reversal of said point on said support.

3. A dipper tooth including a support and a removable point, one of said members having a socket in its base, an elongated interlocking projection on the other of said members split lengthwise thereof, fitting endwise into said socket and extending at an angle to the longitudinal axis of said support, and securing means extending through the length of said projection and having wedging action therein to lock the latter in said socket.

4. A dipper tooth including a support and a removable point, one of said members having a socket in its base, an elongated interlocking projection on the other of said members split lengthwise thereof, fitting endwise into said socket and disposed at an angle to the longitudinal axis of said support, and securing means extending through the length of said projection and having wedging action therein to lock the latter in said socket, said point being substantially symmetrical in shape relative to said socket so as to permit reversal of said point on said support with one side of said point substantially parallel with the longitudinal axis of said support.

5. A dipper tooth including a support and a removable point, one of said members having a cylindrical socket in its base and having its axis disposed parallel with the converging sides of said point, an elongated interlocking projection on the other of said members split lengthwise thereof fitting endwise into said socket, and securing means extending through the length of said projection and having wedging action therein to lock the latter in said socket.

Signed at Chicago this 1st day of June, 1929.

JOHN D. RAUCH.